Patented May 15, 1923.

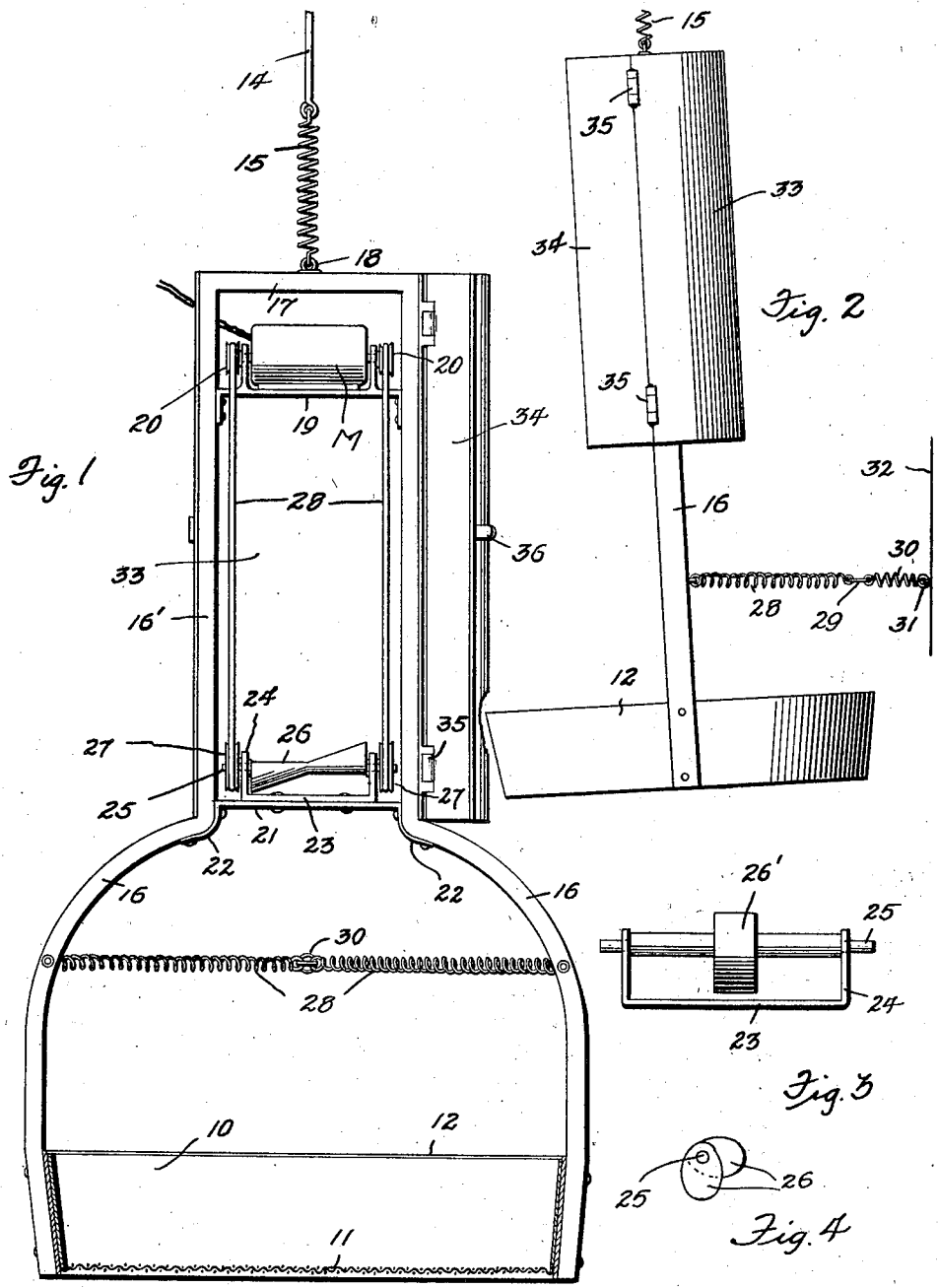

1,455,319

UNITED STATES PATENT OFFICE.

WILLIAM ADELMANN, OF NEW YORK, N. Y.

FLOUR SIFTER.

Application filed November 27, 1922. Serial No. 603,544.

*To all whom it may concern:*

Be it known that I, WILLIAM ADELMANN, a citizen of the United States, residing at New York city, borough of the Bronx, in the county of Bronx and State of New York, have invented certain new and useful Improvements in Flour Sifters, of which the following is a specification.

This invention relates to flour sifters and has particular reference to mechanical means for the rapid and efficient sifting of flour in bake shops or like places where a large amount of flour is required to be so treated.

Among the objects of the invention, therefore, is to provide mechanism, preferably power operated and adapted to be actuated substantially automatically, the same comprising an overhead mechanism, preferably resiliently suspended over the throw (not shown) in which the batch of bread is mixed and kneaded, said mechanism including a sieve or the like into which the flour may be scooped or otherwise delivered by the baker and from which it will be sifted directly into the throw.

Another object of the invention is to provide a power operated device for causing agitation of the hanger or supporting means for the sieve, the agitation being either in a generally vertical direction or a horizontal oscillatory direction or both.

Being aware that in the large city bakeries there is frequently difficulty in enforcing the requirement that the flour be thoroughly sifted so as to remove particles of lint, paper, bits of cord, or other extraneous matter of even a more unsanitary nature, another object of this invention is to provide such facilities as will render it totally inexcusable for a baker to neglect to sift thoroughly and properly the flour preparatory to the baking of a large batch.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a front elevation of a preferred embodiment of the invention, the motor casing being open, and certain parts being broken away to show construction.

Fig. 2 is a side elevation of the same on a somewhat reduced scale and indicating the normal relation of the apparatus adjacent to the wall or support.

Fig. 3 is a detail of a modification to be described below.

Fig. 4 is a diagram indicating an end view of a preferred form of actuator indicating that the two main parts thereof are arranged at less than 180° apart.

Referring now more specifically to the drawings I show at 10 a sieve of any suitable size or form but indicated as comprising a frustoconical rim having a downward taper and a screen 11 secured to the lower edge thereof, as is usual in this sort of devices.

My apparatus comprises a holder 12 consisting of a rim like member of a size and form to receive directly therein and consequently hold the sieve. It will be understood that I am not to be limited in the present description to any particular size or form of such portions of the apparatus. The normal position of the holder and sieve is substantially that as shown in Fig. 2 in which the sieve is held at a slight inclination from the horizontal, or tilted downward in front toward the operator.

The sieve holder 12 is suspended by any convenient but preferably resilient means from any suitable adjacent supports, such as the ceiling and side wall, but mainly however being supported from the ceiling by a hanger 14 and a spring 15. A frame comprising two outwardly bow shaped arms 16 is connected to opposite sides of the holder 12, leaving ample room for the insertion of the sieve therein or its removal from the holder 12, as well as the introduction, as by means of a scoop or shovel, of the flour into the sieve during the operation of the sifter. The side frame members or arms 16 are extended upward parallel to each other as shown at 16' and are connected by a head piece or cross bar 17 at the top and to the center of it, at 18, the coil spring is attached.

Below the head piece 17 is arranged a transverse support 19 for a motor M having a horizontal shaft provided at its opposite ends with pulleys 20 which are of relatively small size and of the same diameter. The support 19 serves also as a transverse stiffener or brace for the frame.

At the lower ends of the straight portions 16' of the frame is fixed another transverse support 21 having curved or angular extensions 22 embracing the elbow attachment points between the bows 16 and the straight members 16'. Fixed upon the upper surface of this latter support 21 is a bracket 23 having a horizontal portion and two upright standards 24 in which is journaled the shaft or axis portion 25 of an actuator 26. Fixed to the ends of the shaft 25 are a pair of pulleys 27 in the same vertical planes as the pulleys 20 respectively, and operating over each pair of pulleys so aligned is a suitable endless belt or chain 28.

As shown in Fig. 1 one preferred form of the actuator is somewhat in the nature of a double cone, the two cone portions being connected at their apexes at about the central portion of the axis 25 and with the base portion of each cone arranged eccentrically of the shaft 25. It is to be noted also that the masses or larger portions of the several cone bases are arranged on different sides of said axis or shaft. From the construction just described it will be understood that with the rotation of the actuator at a suitable relatively high speed from the motor there is imparted to the entire device a vibratory effect, and this vibration takes place not only with respect to the vertical, i. e., the direction perpendicular to the diameter of the sieve, but also because of the oppositely disposed eccentrics of the actuator on opposite sides of the shaft and adjacent to the opposite ends thereof, the entire mechanism is given an oscillation substantially around a vertical central axis of the entire apparatus, imparting to the sieve a rapid movement in arcs of circles of relatively short amplitude, an effect combined with the vertical reciprocations of the apparatus. The shifting effect of the vibrations and oscillations thus described is materially augmented by the fact of the normal inclination of the sieve bottom. Obviously the spring suspension means at 15 permits the vertical reciprocations as just described.

The normal inclination of the frame is determined and maintained by means of guy members 28 connected preferably to the curved portions of the frame 16 spaced well above the sieve and converging to a link 29 from which another spring 30 leads to the point of attachment 31 on the wall or other suitable upright support 32. These members 28 and 30 are preferably resilient so as not to disturb or prevent the desired oscillation around the vertical axis. They serve however to hold the apparatus substantially in the position shown so as to prevent undue vibration or oscillation of the machine to take place.

In Fig. 3 I indicate a form of actuator 26' which comprises a simple eccentric fixed or supported upon the central portion of the shaft 25 journaled and driven as above described. I have found this form of device to be exceedingly satisfactory, with the vibrations produced by this eccentric mainly in a vertical direction, although in both instances described the linked connection between the frame 16 and the wall 32 compels a certain amount of movement of the apparatus in arcs of circles so that in all cases there is a combined movement of vibration and oscillation.

The motor and other operating parts are preferably housed within a casing comprising a main portion 33 and a door 34 hinged at 35 to one side of the casing. A catch 36 of any suitable nature is provided for the opposite side of the door for keeping the casing normally closed.

While this apparatus has been devised and constructed primarily for use in bakeries for the sifting of wheat flour or the like, it will of course be understood that the scope of this specification and claims is not in any manner to be limited by reference to the word flour as material to be sifted, for obviously the apparatus is equally well adapted for sifting all kinds of powdered or pulverulent material.

I claim:

1. In a flour sifter, the combination of a sieve and a holder for the sieve, of means to agitate the sieve, such agitating means including a frame connected to the holder, an eccentric weight journaled in the frame on an axis substantially parallel to the sieve, and means carried by the frame for rotating the weight at relatively high speed.

2. In a flour sifter, the combination with a sieve and a holder corresponding in form and size thereto for embracing the sieve, of means to agitate the sieve, said agitating means including a frame connected to the holder, an eccentric journaled in the frame on an axis substantially parallel to the diameter of the holder, and means acting within the frame for rotating the eccentric at relatively high speed.

3. Mechanism as set forth in claim 2 in which the eccentric is so arranged as to cause vertical reciprocations of the sieve and frame.

4. Mechanism as set forth in claim 2 in which the mechanism is so arranged as to cause oscillation of the sieve in short arcs around the vertical axis of the frame.

5. Mechanism as set forth in claim 2 in which the eccentric mechanism is so constructed as to cause the sieve to be agitated both vertically and in a plane at right angles to the axis of the frame.

6. Mechanism as set forth in claim 2 including resilient supporting means for the frame.

7. In a flour sifter, the combination of a frame including two spaced arms, an actuator journaled on a horizontal axis between said arms, power means acting to rotate the actuator at relatively high speed, said actuator being eccentrically constructed respecting its axis and to cause agitation of the frame, a sieve, means within the lower portion of the frame to support and hold the sieve, and resilient supporting means for the frame, said resilient supporting means including springs extending rearward from the aforesaid frame arms to a fixed vertical support.

In testimony whereof I affix my signature.

WILLIAM ADELMANN.